Oct. 24, 1961   J. H. G. PADELT   3,005,599
REWIND CLUTCH
Filed Nov. 21, 1957
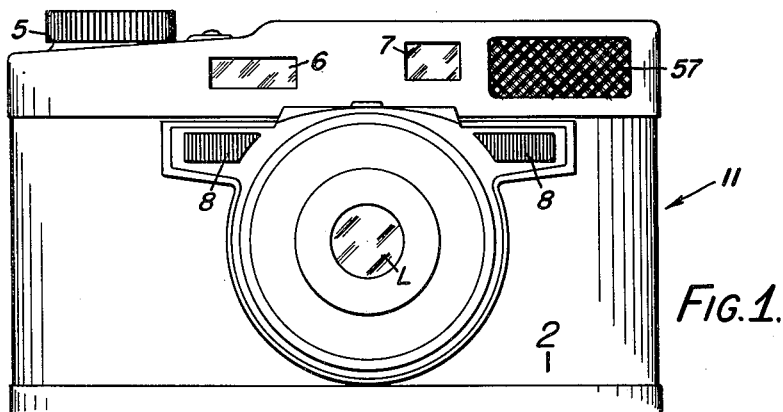
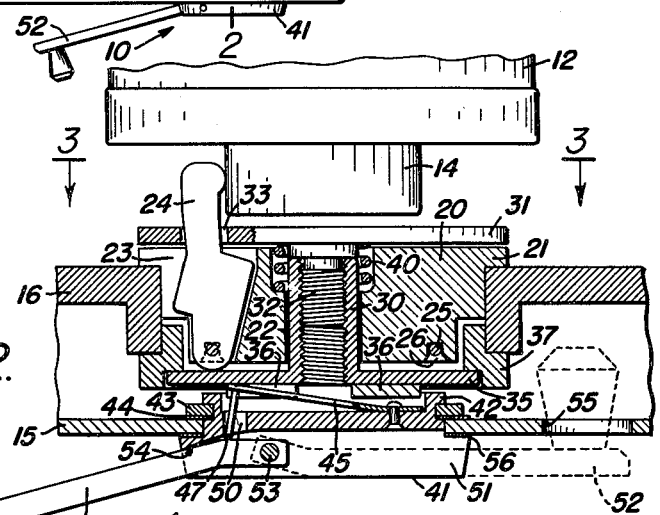
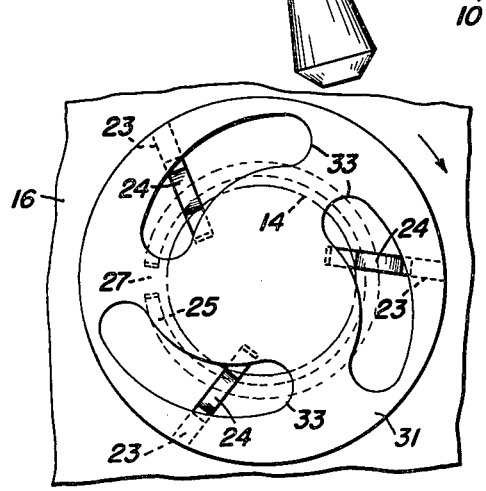
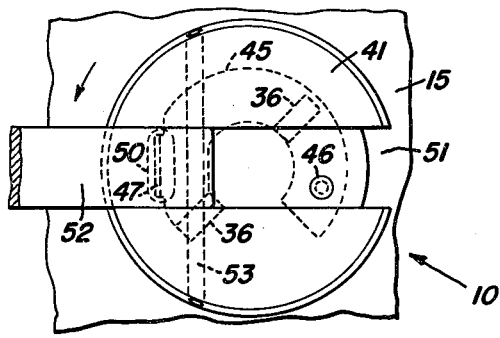
FIG.1.
FIG.2.
FIG.3.
FIG.4.
INVENTOR.
JOHANNES G. PADELT
BY
ATTORNEY United States Patent Office 3,005,599
Patented Oct. 24, 1961

3,005,599
REWIND CLUTCH
Johannes H. G. Padelt, Rochester, N.Y., assignor to Graflex, Inc., Rochester, N.Y., a corporation of Delaware
Filed Nov. 21, 1957, Ser. No. 697,941
4 Claims. (Cl. 242—71.6)

This invention relates to a rewind mechanism for a camera, and more particularly to rewind mechanisms for cameras employing removable cassettes for film supply. In a more specific aspect, the invention relates to a manually-operable rewind mechanism for a camera that has a power-operated film-transporting means.

In the conventional camera the rewind knob or handle is mounted on the upper side. With the introduction and availability of low-priced camera accessories, such as light meters, the presence of a rewind knob on the upper side of the camera has interfered with the installation and convenient use of such accessories. Moreover, since film spools as now manufactured have no rewind key slot on their bottom sides, it is not practical to install ordinary rewind devices on the bottom side of the camera.

With ordinary cameras, the rewind knob is engaged continuously with the spool in the cassette, and an important percentage of the power that is required to transport the film is therefore expended inefficiently in overcoming the inertia and frictional reistance of the rewind mechanism. Where the film-transport is power-driven, this necessitates increased power for the film transporting means, and adds to the weight of the camera. Moreover, the inertia of the rewind mechanism makes it difficult to design a camera that always operates with a constant film winding speed.

One object of the present invention is to provide a practical rewind mechanism that can be mounted at the bottom of a camera.

Another object of the invention is to provide a rewind mechanism for a camera for use with spools such as are employed in the cassettes of small cameras that can be located on the bottom side of such a camera.

Another object of the invention is to provide a film rewind mechanism that does not act as a drag on the winding mechanism.

Another object of the invention is to provide a rewind mechanism that disengages automatically from the film rewind spool when film is transported.

Still another object of the invention is to provide a rewind mechanism that is compact and light in weight.

A further object of the invention is to provide a manually operable rewind mechanism that is simple in construction and inexpensive to manufacture.

Other objects of the invention will be apparent hereinafter from the specification and from the recital of the appended claims, particularly when read in conjunction with the accompanying drawings.

In general, the invention consists of a clutch that is engaged automatically when the rewind handle is in operative position and is rotated in a direction to rewind the film, and that is disengaged automatically when the spool is rotated in a direction to transport film. This insures minimum drag on the film transporting means.

In the embodiment shown in the attached drawing, the clutch is located on the bottom side of the camera to engage the hub of the spool in the cassette. This construction leaves the upper side of the camera free from obstruction, to be used for mounting such accessories as light meters.

In the drawing:

FIG. 1 is a front view of a camera that has a bottom-mounted rewind mechanism, constructed according to one embodiment of this invention, the crank or handle for effecting the rewind operation being shown in operating position;

FIG. 2 is a section on an enlarged scale, taken on the line 2—2 of FIG. 1, showing the rewind mechanism in the position which it occupies during rewinding, that is, engaged against the hub of the spool, the rewind crank being shown in full lines in operative position, and in dotted lines in inoperative position;

FIG. 3 is a section taken on the line 3—3 of FIG. 2, looking in the direction of the arrows, and showing the spool hub also in dot and dash lines; and FIG. 4 is a fragmentary bottom plan view of the rewind mechanism.

Referring now in detail to the drawing by numerals of reference, 10 denotes generally the rewind mechanism and 11 the camera. The invention may be applied, of course, to various types of cameras. That shown is of the so-called "miniature" or "candid" type. 5 denotes the film advance knob of this camera. 6 and 7 designate the windows for the rangefinder of the camera. L denotes the objective lens of the camera; and 8 are the finger rests at opposite ends of the lever (not shown) which is pivoted to effect focusing of the camera. 57 is a light-meter. The rewind mechanism 10 is located at the bottom of the camera casing 11. 12 (FIG. 2) denotes a removable cartridge or cassette, such as is commonly used in a camera of the type described, and 14 is the hub of the spool of this cassette. It projects through the lower end of the cassette, as shown.

One part of the rewind mechanism is supported on the cover 15 of the camera, and another part of the rewind mechanism is mounted on the camera housing 16. The rotary members of both parts are mounted to be in axial alignment with the hub 14 of the spool of the cassette when the cassette is positioned in the camera.

The portion of the rewind mechanism that is mounted on the housing 16 includes a rotary mount 20 that is formed at its upper end with a flange 21 that seats on the underlying portion of the housing 16. The mount 20 has an axially extending bore 22 and three straight-sided, non-radial elongate apertures or slots 23 that are disposed in equi-angularly spaced relation about the axis of the mount. The slots 23 are identically oriented relative to the axis of the mount, and have imaginary center planes that, if extended, would be tangential to a cylinder circumscribed about the axis of the mount. Three clutch levers 24 are pivotally mounted at their lower ends in the respective slots 23, to be moved into or out of engagement with the hub 14. The levers 24 are pivoted on a wire retainer 25 that is engaged in a channel 26 in the lower face of the mount and that is passed through openings in the levers. The channel 26 is interrupted by a shoulder 27 (FIG. 3), against which the ends of the wire retainer 25 are abutted.

A hollow, internally-threaded shaft 30 is journaled in the bore 22 of the mount 20, coaxial with the mount. A disc 31 is secured to this shaft by an integral centrally-disposed downwardly projecting stud 32 which threads into the shaft. The disc 31 is disposed to overlie the upper face of the mount 20. It is formed with three equi-angularly spaced arcuate slots 33 of uniform width from end to end. The three slots 33 are identically oriented with respect to the axis of the shaft 30, and are eccentric of the axis of the shaft, being curved about centers on the imaginary cylinder to which the center lines of the slots 23 are tangent. The levers 24 extend through the respective slots 33 of the disc 31.

The shaft 30 is formed at its lower end with an integral flange 35 that is in substantial parallelism with the disc 31, and that is disposed beneath the mount 20. A pair of coupling blocks 36 are rigidly secured on the lower face of the flange 35, in diametrically opposed relation.

A bearing or closure 37 is interposed between the flange 35 and the housing 16 and has a pressed fit on the casing.

The bore 22 of the mount 20 is counterbored at its upper end to receive a spring 40 which is interposed between the bottom of the counterbore and the disc 31, constantly to press disc 31 upwardly and thereby to hold the flange 35 in frictional engagement with the bearing member 37.

The portion of the rewind mechanism that is mounted on the camera cover 15 includes a rotary head 41. On its upper face, the head 41 is formed with a generally cylindrical projection 42 that projects through a hole in the cover 15 and has an annular peripheral recess therein. A snap-ring 43 is engaged in this recess to lock the head on the camera cover 15; and a washer 44 is interposed between the snap-ring 43 and the camera cover.

A flat, arcuate spring 45 is secured at one end in a counterbore in the upper surface of the head 41 by a rivet 46 or other conventional fastener. This spring is formed adjacent its free end with a downwardly depending finger 47 that projects through an aperture 50 in the head.

The lower face of the head 41 is formed with a diametrally-extending groove 51 that extends from one side of the head to the other. A crank or handle 52 is pivotally mounted on a pin 53 that is secured to the head 41 transversely of this groove 51.

The aperture 50 through which the finger 47 of the spring 45 projects communicates with the groove 51. When the handle 52 is pivoted about the pin 53 to operative position, as shown in full lines in FIG. 2, it engages the finger 47 of the spring 45, to press the spring upwardly to connect the head drivingly with the disc 35. The bottom face of the groove 51 is inclined downwardly at one end, as denoted at 54 in FIG. 2, to hold the handle 52 away from the camera cover 15 in the operative position of the handle (FIGS. 1 and 2). When not in use, the handle 52 can be pivoted out of the way, to seat in the groove 51, in the position indicated in FIG. 2 in dotted lines, with the knob of the handle engaged and concealed in an opening 55 in the camera cover 15.

A gasket 56 or washer is interposed between the head 41 and the lower confronting portion of the camera cover 15.

When all the film in the camera has been exposed, the rewind mechanism can be employed to wind the film back into the cassette 12. To rewind the film, the handle 52 is moved to the full line position shown in FIG. 2, and it is rotated in a counter-clockwise direction, as viewed in FIG. 4, and clockwise as viewed in FIG. 3.

When the handle 52 is moved to its operative position, it engages the finger 47 of the spring 45 and forces the spring upwardly. The head 41 rotates freely until the spring 45 engages against one of the coupling blocks 36. Then the flange 35 is also moved to rotate the shaft 30 and the disc 31. The mount 20, however, is held stationary initially by the frictional engagement between the flange 21 of the mount and the frame 16. For a short time, therefore, the levers 24 are held stationary in the mount 20 while the disc 31 is rotated.

As the disc 31 is rotated, the levers 24 are moved inwardly by the arcuate slots 33 into engagement with the hub 14 of the film spool. Because the levers 24 are rectangular in section, and because they are engaged in non-radial slots 23, the sharp edges of the levers 24 bite into the hub 14 to grasp it firmly. Then, as the rotation of the handle 52 is continued, the levers 24 are rotated with the upper disc 31, to rotate the mount 20, and, as well, the hub 14. After the film has been rewound on the spool, the cassette can be removed from the camera, and a new cassette substituted therefor.

When the handle 52 is not in use, it can be pivoted to engage in the groove 51 in the head, and the knob of the handle can be inserted through the opening 55 in the camera cover, where it will be concealed and out of the way.

If, during picture taking, the levers 24 should happen to be accidentally left engaged with the hub 14, then as soon as film transport occurs, the movement of the hub 14, which will be in a clockwise direction relative to FIG. 4, will move the levers to release position, so that there will be no drag on the film as it is transported by rotation of the wind-up spool of the camera. This is an important feature, particularly in cameras that are provided with power-actuated film transport mechanism.

Another important feature of the invention is that a considerable amount of space is freed at the top of the camera that can be employed for mounting a light meter, in the manner illustrated, or for mounting other desirable accessories.

While the invention has been described in connection with a specific embodiment thereof, it will be understood that it is capable of further modification, and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A film rewind mechanism for a camera that is adapted to have a film rewind spool disposed therein, comprising a mount rotatably mounted on the chassis of said camera and formed with a plurality of non-radial straight slots, a shaft rotatably mounted in said mount coaxially therewith, the walls of each of said slots being parallel to each other, said slots being identically oriented relative to the axis of said mount and having imaginary center lines that, if extended, would be tangential to a cylinder circumscribed about the axis of said mount, a rotary member secured on said shaft in axially-spaced relation from said mount to rotate with said shaft, said rotary member being formed with a plurality of arcuate slots corresponding in number to said non-radial slots, each said arcuate slot having walls that are eccentric of the axis of said shaft, a plurality of levers pivotally supported on said mount, each said lever being disposed in one of said straight slots and in one of said arcuate slots whereby upon rotation of said member relative to said mount in one direction all said levers are pivoted into operative engagement with said spool, and means for rotating said shaft in said one direction to effect pivotal engagement of said levers with the spool and to rotate the spool after said engagement has been effected.

2. A film rewind mechanism for a camera that is adapted to have a film rewind spool disposed therein, comprising a mount rotatably mounted on the housing of said camera, a shaft rotatably mounted in said mount coaxially therewith, a member secured to said shaft for rotation upon rotation of said shaft and formed with an arcuate slot eccentric of the axis of said shaft, a lever pivotally supported in said mount and in said slot whereby upon rotation of said member relative to said mount in one direction said lever is pivoted to move into operative engagement with said spool, and rewind crank means movably mounted on said camera, said crank means being rotatable in one direction, when in operative position, to drive said member to effect movement of said lever into engagement with said spool and thereafter to drive said spool through said lever, said rewind crank means including a coupling disc secured to said shaft and formed with a dog, a rotary head, a crank mounted on said head for movement to and from operative position, and a spring secured to said head and normally disengaged from said dog, said spring being mounted to be moved to engage said dog when said crank is moved to operative position.

3. A film rewinding mechanism for a camera that is adapted to have a rewind spool disposed therein, comprising a mount rotatably mounted on the camera and provided with a plurality of slots, a plurality of levers equispaced angularly about the axis of said mount, one of said levers being mounted to swing in each of said slots, each of said slots having guide walls at opposite sides for the lever disposed in the slot, said guide walls lying in planes offset from the axis of said mount, each lever being pivotally mounted adjacent one end on said mount and each having a gripping portion at its opposite end for engagement with the spool, a member rotatably mounted on said mount coaxially thereof between the ends of said levers, said member having a plurality of arcuate slots eccentric of its axis but equispaced angularly about its axis, each of said levers extending through one of said arcuate slots at a point intermediate the ends of said lever, means for rotating said member in one direction to cause said arcuate slots to swing the gripping portions of said levers into driving engagement with the spool and to drive the spool after the levers have been drivingly engaged with the spool, and said levers being rectangular in cross-section so as to have sharp corners at their inner ends which bite into the spool when the levers are moved into engagement therewith.

4. A film rewind mechanism for a camera as claimed in claim 3 wherein the means for rotating said member comprises a head rotatable on the camera, a crank handle pivotally mounted on said head for movement into and out of operative position, and coupling means movably mounted in said head and disposed to be moved by said crank handle, when said crank handle is in operative position, to couple said head to said mount to rotate said mount when said head is rotated by said crank handle.

References Cited in the file of this patent

UNITED STATES PATENTS

| | | |
|---|---|---|
| 1,006,216 | Hollowell | Oct. 17, 1911 |
| 1,634,536 | Edelmann | July 5, 1927 |
| 2,639,100 | Wehrenfennig et al. | May 19, 1953 |